United States Patent [19]
Johnson, Jr. et al.

[11] Patent Number: 5,920,265
[45] Date of Patent: Jul. 6, 1999

[54] WATERLINE LEAK DETECTION AND SHUTOFF SYSTEM

[76] Inventors: George Johnson, Jr.; Mary L. Johnson, both of 33 Shirley Ave., Buffalo, N.Y. 14215

[21] Appl. No.: 09/095,534

[22] Filed: Jun. 1, 1998

[51] Int. Cl.⁶ .................................................. G08B 21/00
[52] U.S. Cl. ...................... 340/605; 340/606; 340/609; 200/61.05; 200/81.9 M
[58] Field of Search .................. 340/605, 606, 340/607, 608, 609, 610, 611; 73/40, 40.5 R, 861.74, 861.75; 200/81.9 M, 81.9 R, 61.05; 137/551

[56] References Cited

U.S. PATENT DOCUMENTS

| | | | |
|---|---|---|---|
| 3,387,489 | 6/1968 | Young | 340/606 |
| 3,860,024 | 1/1975 | Turley | 137/39 |
| 4,143,255 | 3/1979 | Herscovitz | 340/610 |
| 4,191,951 | 3/1980 | Fuzzell | 340/610 |
| 4,847,599 | 7/1989 | Imiolex et al. | 340/605 |
| 4,963,857 | 10/1990 | Sackett | 340/606 |
| 5,347,264 | 9/1994 | Björkman | 340/611 |
| 5,357,241 | 10/1994 | Welch, Jr. et al. | 340/605 |
| 5,377,529 | 1/1995 | Boyd | 340/605 |
| 5,440,917 | 8/1995 | Smith et al. | 73/40 |
| 5,539,384 | 7/1996 | Frasier | 340/605 |
| 5,572,327 | 11/1996 | Plinke et al. | 356/438 |
| 5,656,998 | 8/1997 | Campbell | 340/605 |

*Primary Examiner*—Daniel J. Wu
*Assistant Examiner*—Van T. Trieu
*Attorney, Agent, or Firm*—Joseph N. Breaux

[57] ABSTRACT

A waterline leak detection and shutoff system comprising an in-line flap valve which includes a pivotal valve flap member having attached thereto a magnet and first magnetically responsive switch which switches states, when the magnet is moved from a first position to a second position by forces exerted by flowing water, to activate a counter, and a second magnetically responsive switch which switches states, when the magnet is moved from the second position to the first position as the water ceases flowing, to reset the count of the counter. The counter continuously counts while the magnet is in the second position wherein if the count reaches a predetermined time limit an alarm means and/or an in-line shutoff valve are activated.

2 Claims, 2 Drawing Sheets

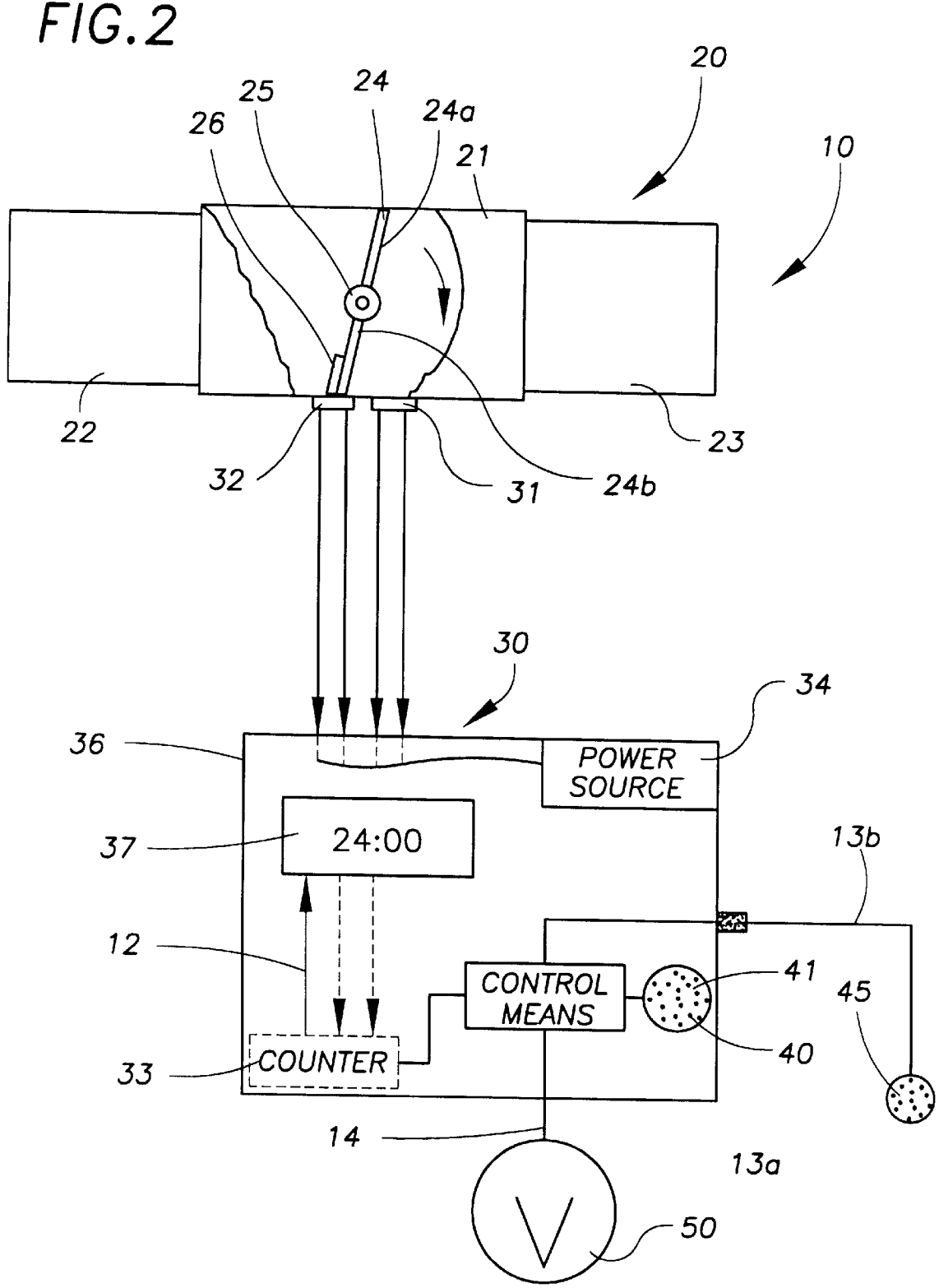

WATERLINE LEAK DETECTION AND SHUTOFF SYSTEM

TECHNICAL FIELD

The present invention relates to water leak detection devices and, more particularly, to a waterline leak detection and shutoff system comprising an in-line flap valve which includes a pivotal valve flap member having attached thereto a magnet and first magnetically responsive switching means which switches states, when said magnet is moved from a first position to a second position by forces exerted by flowing water, to activate a counter, and a second magnetically responsive switching means which switches states, when said magnet is moved from said second position to said first position as the water ceases to flow, to reset the count of said counter. The counter continuously counts while said magnet is in said second position wherein if the count reaches a predetermined time limit an alarm means and/or an in-line shutoff valve are activated.

BACKGROUND OF THE INVENTION

In a home or building, water is readily used for various reasons throughout the day and night. For example, in homes, water is used randomly and for varying time intervals to wash clothes, cook, wash dishes, wash hands, use the bathroom, bath, etc. The water usage in commercial establishments is used randomly also. For example, the occupants randomly use the bathroom, drink water from water fountains, etc. Therefore, it is very difficult to predict the water usage time table for a home or building to design a waterline leak detection system to detect a water leak in metered water systems.

As is known, some waterline leaks can be easily detected because of the presence of detected ground water or the presence of water puddles in the vicinity of a water pipe. However, other waterline leaks go undetected until a water bill which is outrageously high is received for the public utility company.

I have determined, that in most homes and buildings, it is very improbable that water continuously flows for 24 hours. Therefore, if water does flow continuously for 24 hours there is a very high probability that there exists a waterline leak.

Several devices have been patented which are aimed at leak detection and/or fluid shutoff systems.

U.S. Pat. No. 5,656,999, to Campbell, entitled "FLUID LEAK CONTAINMENT SYSTEM" discloses a system to detects leaks or ruptures in oil circulation conduits.

U.S. Pat. No. 5,572,327, to Plinke et al., entitled "REMOTE LEAK DETECTION SENSING METHOD AND DEVICE" discloses a method and apparatus for monitoring the status of particle filtration devices found in various filter units. The invention employs one or more light sources aimed across the filter units and one or more corresponding detectors that detect changes in light intensity from the light source. If a leak occurs dust is released into the atmosphere around any given filter unit which will decrease the light intensity.

U.S. Pat. No. 5,539,384, to Frasier, entitled "ELECTRONIC WATER UTILITY SAFETY APPARATUS" discloses an electronic water utility safety apparatus having a control box positionable with the house of the user. A display indicates a sensed water pressure. An indicator is mounted in the box to generate an audible signal upon the pressure being modified from an acceptable range. A sensor is mounted on the line to determine the pressure within the line and to allow the indicator to display such pressure reading. A valve is located within the water line adjacent to the sensor to shut off the flow of water upon the pressure being outside of a predetermined range.

U.S. Pat. No. 5,440,917, to Smith et al., entitled "LEAK DETECTOR" discloses a leak detector comprising an integral part of its construction an absorbent ring with a conductive strip running around its entire inner surface. The absorbent ring is placed inside a "U" shaped non-conductive ring that has a conductive strip running around the inner surfaces The rings act as a sensor.

U.S. Pat. No. 5,357,241, to Welch, Jr. et al., entitled "FAIL-SAFE LEAK DETECTOR" discloses a damage-prevention system having valves to shut off the supply of water to tanks and valves for draining the tanks. Furthermore, power is shut off to the hot-water tank. The system includes a fail-safe water detector which comprises a float with a metal cap, a first pair of electrical probes below the float, and a second pair of electrical probes above the metal cap and separated from the cap by an air gap. The circuit is closed when water contacts the first pair of electrical probes, the second pair of electrical probes, or when water contacts the metal cap and the second pair of probes.

U.S. Pat. No. 5,347,264, to Bjorkman, entitled "METHOD AND APPARATUS FOR AUTOMATICALLY CONTROLLING A WATER SUPPLY USING MOVEMENT DETECTOR MEANS" discloses an apparatus which detects the presence or movement of individuals inside the premises to maintain a valve open. When the presence or movement of individuals is not detected, the valve is closed. The apparatus serves to minimize the risk of undesired escape of water.

While each of the above leak detection and/or fluid shutoff systems function as desired, none of them have a waterline leak detection and shutoff system comprising an in-line flap valve which includes a pivotal valve flap member having attached thereto a magnet and first magnetically responsive switching means which switches states, when said magnet is moved from a first position to a second position by forces exerted by flowing water, to activate a counter, and a second magnetically responsive switching means which switches states, when said magnet is moved from said second position to said first position as the water ceases to flow, to reset the count of said counter; wherein the counter continuously counts while said magnet is in said second position; and, wherein if the count reaches a predetermined time limit an alarm means and/or an in-line shutoff valve are activated.

As will be seen more fully below, the present invention is substantially different in structure, methodology and approach from that of the prior leak detection and/or fluid shutoff systems.

SUMMARY OF THE INVENTION

The preferred embodiment of the waterline leak detection and shutoff system of the present invention solves the aforementioned problems in a straight forward and simple manner. What is provided is a waterline leak detection and shutoff system comprising an in-line flap valve which includes a pivotal valve flap member having attached thereto a magnet and first magnetically responsive switching means which switches states, when said magnet is moved from a first position to a second position by forces exerted by flowing water, to activate a counter, and a second magnetically responsive switching means which switches states, when said magnet is moved from said second position to said first position as the water ceases to flow, to reset the count of said counter. The counter continuously counts while said magnet is in said second position wherein if the count reaches a predetermined time limit an alarm means and/or an in-line shutoff valve are activated.

The waterline leak detection and shutoff system for detecting a leak or rupture in a waterline comprises: an in-line flap valve coupled to said waterline wherein said in-line flap valve includes: a central housing having an inlet orifice and an outlet orifice; a pivotal valve flap member pivotally coupled to move from a first position to a second position, and a magnet attached to said pivotal valve flap member. The waterline leak detection and shutoff system further comprises: first magnetically responsive means for switching from a first state to a second state as said magnet is moved from said first position to said second position by forces exerted by flowing water; second magnetically responsive means for switching from a first state to a second state as said magnet is moved from said second position to said first position when said flowing water ceases flowing; a counter electrically coupled to said first magnetically responsive switching means and said second magnetically responsive switching means wherein said counter continuously counts while said first magnetically responsive switching means is in said second state thereof and said counter is reset to zero when said second magnetically responsive switching means switches states from said first state to said second state thereof; and, an alarm means for indicating the presence of said leak or said rupture when said counter reaches a predetermined limit.

Preferably, the first and second positions of the pivotal valve flap member correspond to an open position and a closed position, respectively. Furthermore, the first magnetically responsive switching means switches from a first state to a second state in the absence of or reduced amount of said magnetism when said pivotal valve flap member pivots from said closed position to said open position by forces exerted by flowing water. Additionally, the second magnetically responsive switching means switches from a first state to a second state in the absence of or reduced amount of said magnetism when said pivotal valve flap member pivots from said open position to said closed position when said flowing water ceases flowing.

In view of the above, an object of the present invention is to provide a waterline leak detection and shutoff system for detecting a leak or rupture in a waterline which includes a flap valve having a pivotal valve flap member pivotally coupled to move from a closed position to an open position; a magnet attached to said pivotal valve flap member and which exerts a magnetic force; a means for detecting a leak or rupture responsive to said magnetic force to detect said pivotal valve flap member in said the open position for a predetermined limit; and, an alarm means for indicating the presence of said leak or said rupture when said predetermined limit is reached.

Another object of the present invention is to provide a waterline leak detection and shutoff system which includes an in-line shutoff valve for shutting off the flow of water when the count has reached the predetermined time limit.

A further object of the present invention is to provide a waterline leak detection and shutoff system which includes a counter which preferably counts to a predetermined time limit of 24 hours. Nevertheless, the predetermined time limit may be set to any time interval which is sufficient to accommodate for random daily usage of water in a home or building such that erroneous activation of the alarm means and/or in-line shutoff valve are prevented.

It is a still further object of the present invention is to provide a waterline leak detection and shutoff system which includes a control box with a visual display of the count from the counter and an alarm means.

It is a still further object of the present invention to provide a waterline leak detection and shutoff system which is positionable on the output side of a water meter and which detects water leaks or ruptures in a waterline to minimize the expenditure of water due to a leak or rupture and the costs associated with such expenditure of water.

It is a still further object of the present invention to provide a waterline leak detection and shutoff system which is designed to continuously monitor the flow of water through a waterline wherein, when water flows continuously for a predetermined time limit, such as 24 hours, an alarm means is activated to indicate that a leak or rupture is present.

In view of the above objects, it is a feature of the present invention to provide a waterline leak detection and shutoff system which is simple to manufacture.

Another feature of the present invention is to provide a waterline leak detection and shutoff system which is relatively simple structurally.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 illustrates the flap valve of the present invention in partially the open position and having a portion of the central housing removed and the schematic diagram of the leak detection means with an optional remote alarm means; and, FIG. 3 illustrates an end view of the valve flap member in the closed position of the present invention.

DESCRIPTION OF THE EXEMPLARY EMBODIMENT

Figure 1:
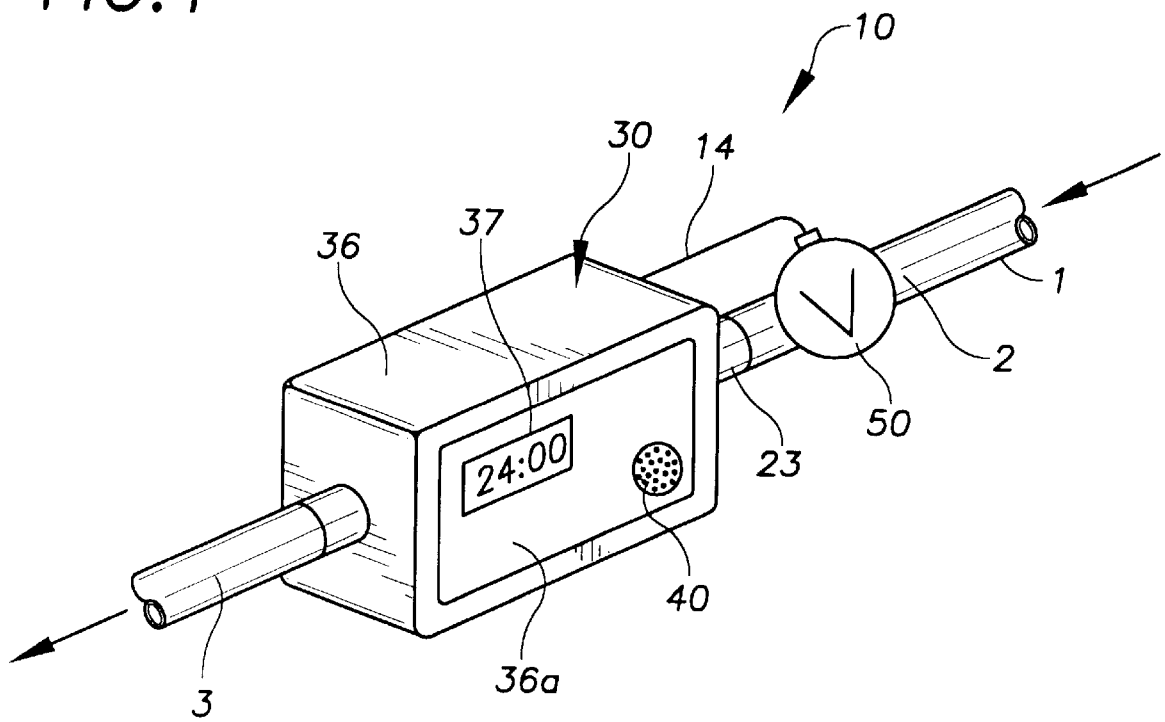
FIG. 1 illustrates a perspective view of the preferred embodiment of the waterline leak detection and shutoff system of the present invention coupled to a waterline wherein the flap valve is integrated in the control box.
Figure 3:
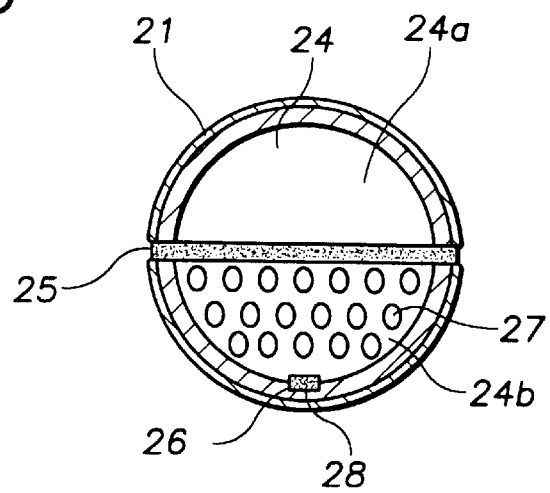

Referring now to the drawings, and in particular FIGS. 1–3, the waterline leak detection and shutoff system of the present invention is designated generally by the numeral 10. Waterline leak detection and shutoff system 10 is comprised of flap valve 20, leak detection means 30, alarm means 40, and in-line shutoff valve 50.

Flap valve 20 comprises central housing 21, inlet orifice 22 outlet orifice 23, valve flap member 24 pivotally coupled in central housing 21 via pivot axle 25 and magnet 26, as best seen in FIG. 2. Inlet orifice 22 is coupled to pipe portion 2 of waterline 1 on the output side of a water meter (not shown) and passes water into central housing 21. Outlet orifice 23 is coupled to pipe portion 3 of waterline 1 to allow water flowing through flap valve 20 into the home or building.

Valve flap member 24 is circularly shaped and is pivotally coupled in central housing 21 via pivot axle 25 aligned across the center of valve flap member 24 to create two semi-circular halves. First semi-circular half 24a is solid.

Second semi-circular half 24b has a plurality of holes 27 formed therein.

Magnet 26 is coupled to apex 28 of second semi-circular half 24b. In the preferred embodiment, magnet 26 is coated with rubber to prevent rusting of magnet 26 during the operational life of waterline leak detection and shutoff system 10. In operation magnet 26 serves to produce to three operational forces. The first force magnet 26 exerts is a biasing force to maintain second semi-circular half 24b in a vertically upright position in the absence of flowing water through central housing 21. The second force magnet 26 exerts is a counterbalancing force wherein magnet 26 functions to counterbalance impart the force of flowing water through second semi-circular half 24b. The third force exerted by magnet 26 is its inherent magnetic force (magnetism).

Flap valve 20 has a closed position, as best seen in FIG. 3, and an open position, as best seen in FIG. 2. An open position, as best seen in FIG. 2. Flap valve 20 is in the closed position when valve flap member 24 is vertically upright wherein magnet 26 serves to bias valve flap member 24 vertically upright such that second semi-circular half 24b is always located in the lower portion of central housing 21. Since second semi-circular half 24b has a plurality of holes 27 formed therein, the flow of water is slight obstructed to create a force on the inlet side of valve flap member 24. This force causes valve flap member 24 to rotate rearwardly such that magnet 26 is rotated rearwardly and second semi-circular half 24a of valve flap member 24 is offset rearwardly from the vertically upright position (closed position).

The biasing weight provided by magnet 26 counterbalances impart the force from the water to maintain second semi-circular half 24b of flap valve member 24 rearwardly offset. When flap valve member 24 is in such angled position rearwardly offset from the vertically upright position (closed position), flap vale 20 is in the opened position.

The unique design of valve flap member 24 with magnet 26 allows flap valve 20 to automatically transition via pivot axle 25 to the closed position from an open position in response to the absence of flowing water. Additionally, flap valve 20 automatically transitions via pivot axle 25 to an open position from the closed position in response to the presence of flowing water.

In the preferred embodiment, central housing 21 is tubularly shaped and dimensioned to pivotally housing therein valve flap member 24. While not shown, the interior surface in the lower half of central housing 21 may be provided with stop protrusions to limit the rotation in the rearward direction of valve flap member 24. Thereby, if a strong burst of water passes through inlet orifice 22, valve flap member 24 would not be allowed to rotate to the upper half of central housing 21.

Leak detection means 30 comprises first magnetically responsive switch means 31, second magnetically responsive switch means 32, counter 33, and power source 34. First and second responsive switch means 31 and 32 are coupled to the bottom side of the exterior surface of central housing 21 in side-by-side spaced relation. First magnetically responsive switch means 31 is normally open and closes when valve flap member 24 is in an open position. More specifically, when the valve flap member 24 pivots rearwardly toward the open position, the absence or weakening of the force exerted by magnet 26 causes first magnetically responsive switch means 31 to close thereby, activating counter 33. Counter 33 continuously counts as long as first magnetically responsive switch means 31 is closed.

In the preferred embodiment, counter 33 counts in intervals of time wherein counter 33 activates alarm means 40 and/or in-line shutoff valve 50 after a predetermined time limit has elapsed. In the exemplary embodiment, the predetermined time limit is a maximum of 24 hours. I have determined that a predetermined time limit of 24 hours provides a sufficient time limit to determine if a water leak in a waterline 1 is present regardless of the random water usage in a home or building. Thereby, alarm means 40 and/or in-line shutoff valve 50 would not be activated erroneously. In most homes and buildings, water is not turned on in the home or building continuously for 24 hours, unless the home or building has very specific needs that requires the continuous flow of water for more than 24 hours. While the preferred embodiment provides for a 24 hour time limit, other time limits may be provided. For example, 20 hours, 21 hours, 22 hours, or 23 hours may be substituted. The predetermined time limit should be sufficient to accommodate for random water usage in a home and building without the erroneous activation of alarm means 40 and/or in-line shutoff valve 50.

As can be appreciated, if a waterline leak or rupture is detected and waterline 1 is shutoff via in-line shutoff valve 50, the expenditure of water due to impart the leak or rupture would be terminated after a maximum time of 24 hours. Henceforth, the cost of such expenditure of water due to the leak or rupture is not further accumulated. In the exemplary embodiment, in-line shutoff valve 50 is positioned in pipe portion 2 of waterline 1 prior to inlet orifice 22. Preferably, alarm means 40 is an audible alarm and in-line shutoff valve 50 is a solenoid operated shutoff valve.

Referring again to the operation of leak detection means 30, second magnetically responsive switch means 32 is normally closed and is maintained closed while valve flap member 24 is in the closed position resetting counter 33 to zero. On the other hand, when valve flap member 24 rotates to the open position, second magnetically responsive switch means 32 momentarily switches from the closed state to the open state. In addition, when valve flap member 24 rotates from the open position to the closed position because of the absence of flowing water, second magnetically responsive switch means 32 is switched back to the closed position and also causing the count of counter 33 to be reset to zero.

First and second magnetically responsive switch means 31 and 32 are coupled to the exterior surface of central housing 21 wherein first magnetically responsive switch means 31 is essentially aligned directly below valve flap member 24 when valve flap member 24 is in the closed position (vertically upright). Since magnet 26 is coupled to apex 28 of second semi-circular half 24b of valve flap member 24, the magnetic force exerted on first magnetically responsive switch means 31 when valve flap member 24 is vertically upright is strong and serves to maintain first magnetically responsive switch means 31 in the open position. The magnetic force is weakened or eliminated when valve flap member 24b pivots rearwardly to the open position. Thereby, the absence of or weakened magnetism causes first magnetically responsive switch means 31 to switch from the open position of the closed position.

Second magnetically responsive switch means 32 is positioned on the side of first magnetically responsive switch means 31 rearward of valve flap member 24. Thereby, when valve flap member 24 is pivoted rearwardly under the flow of flowing water toward its open position, magnet 26 is moved in relative close proximity of second magnetically responsive switch means 32. The magnetism (magnetic force) exerted by magnet 26 is strong causing second magnetically responsive switch means 32 momentarily from its closed position to its open position resetting counter 33. When flap valve member 24 rotates forwardly to its closed position the magnetism of magnet 26 is and applied again to first magnetically responsive switch means 31.

In the preferred embodiment, first and second magnetically responsive switch means 31 and 32 are magnetic reed switches. Counter 33 is a digital counter.

Leak detection means 30 further comprises control box 36, display means 37 and control means 39. Control box 36 has front panel 36a which has coupled thereto display means 37 which displays the count of counter 33. Thereby, from time-to-time, the water usage can be inspected by the user. Display means 37 may be a liquid crystal display or a LED display. Display means 37 is electrically coupled to counter 33 via line 12.

Front panel 36a also has coupled thereto alarm means 40 which in the preferred embodiment includes speaker 41 and sound producing element (not shown). Sound producing element may produce a beep, buzzing sound or siren sound through speaker 41 such that a loud audible signal is produced to notify the home or building, occupants, maintenance engineers, etc. of the leak or rupture.

Control means 39 is electrically connected between counter 33 and alarm means 40 wherein control means 39 includes a simple circuit such as a comparator or other logic circuit to detect when the predetermined time limit is reached. Henceforth, when the predetermined time limit is reached control means 39 activates alarm means 40 and/or remote alarm 45 via lines 13a and 13b and in-line shutoff valve 50 via line 14.

While the exemplary embodiment provides for alarm means 40 which produces a audible signal, a visual indicator may also be provided. Furthermore, in addition to alarm means 40 coupled in front panel 36a, remote alarm means 45 may be provided in the home or building. Thereby, a loud audible signal will also be sounded in the home or building.

Regarding power source 34, power source 34 may be a battery or power from the public utility company. In the exemplary embodiment for illustrative purposes only, power source 34 is a battery. If a battery is selected to power leak detection means 30, battery conservation techniques may be employed. Nevertheless, power from power source 34 is coupled to first and second magnetically responsive switch means 31, and 32 and the circuitry in control box 36.

In the preferred embodiment, flap valve 20 is encased in control box 36, as best seen in FIG. 1. Nevertheless, control box 36 may be separate from flap valve 20 and coupled to the exterior of the home or building near the water meter and flap valve 20.

In the exemplary embodiment, first magnetically responsive switch means 31 may serves as an on/off switch for powering the circuitry in control box 36 wherein when first magnetically responsive switch means 31 is open, counter 33 is off, display is off, etc. The second magnetically responsive switching means 32 would serve to only reset counter 33. Thereby, power would only need to be provided when valve flap member 24 is in the open position.

Alternately, first and second magnetically responsive switching means 31 and 32 may function only to produce on/off control signals to control counter 33. Therefore, battery conservation techniques could be employed to conserve power.

In summary, the first and second magnetically responsive switching means 31 and 32 are located on the exterior side of central housing 21 near where magnet 26 rests. Under normal functioning, first magnetically responsive switching means 31 serves to detect the opening of flap valve 20 wherein first magnetically responsive switching means 31 closes when there is an absence of magnetism from the flap-valve mounted magnet 26. When first magnetically responsive switching means 31 closes counter 33 begins counting. Second magnetically responsive switch means resets counter 33 to zero, closing when the flap valve is closed. Therefore, as long as there is a continuous water flow (indicating a leak), counter 33 will count until the predetermined time limit is reached and thereafter activating alarm means 40 and optionally remote alarm means 45.

Under normal functioning (when there is no leak in the system), flap valve 20 opens when water is flowing through flap valve 20 and counter 33 starts counting. When the water is turned off in the home or building, flap valve 20 closes causing second magnetically responsive switching means 32 to reset counter 33. In the absence of a leak, water should not flow continuously for the predetermined time limit provided such predetermined time limit is chosen to accommodate for the water usage in the home or building.

It is noted that the embodiment of the waterline leak detection and shutoff system described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A waterline leak detection and shutoff system for detecting a leak or rupture in a waterline comprising:
   an in-line flap valve coupled to said waterline wherein said in-line flap valve includes:
      a central housing having an inlet orifice and an outlet orifice;
      a pivotal valve flap member pivotally coupled to move from a closed position to an open position, and
      a magnet attached to said pivotal valve flap member and which exerts a magnetic force;
   means for detecting a leak responsive to said magnetic force to detect said pivotal valve flap member in said the open position for a predetermined limit; and, an alarm means for indicating the presence of said leak or said rupture when said predetermined limit is reached said leak detecting means comprising first magnetically responsive means for switching from a first state to a second state as said magnet moves when said pivotal valve flap member has pivoted from said closed position by forces exerted by flowing water; second magnetically responsive means for switching from a first state to a second state as said magnet moves when said pivotal valve flap member pivots from said open position toward said closed position when said flowing water ceases flowing; and, a counter electrically coupled to said first magnetically responsive switching means, said second magnetically responsive switching means and said alarm means wherein said counter continuously counts while said first magnetically responsive switching means is in said second state thereof and said counter is reset to zero when said second magnetically responsive switching means switches states from said first state to said second state thereof;

said first and second magnetically responsive switch means being positioned in side-by-side spaced relation.

2. The waterline leak detection and shutoff system of claim 1, further comprising an in-line shutoff valve coupled to said waterline which is activated to shutoff said flowing water in said waterline when said counter reaches said predetermined limit.

\* \* \* \* \*